(12) United States Patent
Hinton et al.

(10) Patent No.: US 9,460,169 B2
(45) Date of Patent: Oct. 4, 2016

(54) MULTI-TENANT AUDIT AWARENESS IN SUPPORT OF CLOUD ENVIRONMENTS

(75) Inventors: Heather M. Hinton, Austin, TX (US); Richard Jay Cohen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 13/004,945

(22) Filed: Jan. 12, 2011

(65) Prior Publication Data
US 2012/0179646 A1    Jul. 12, 2012

(51) Int. Cl.
*G06F 17/30* (2006.01)

(52) U.S. Cl.
CPC ............................. *G06F 17/30557* (2013.01)

(58) Field of Classification Search
USPC .......................................................... 707/736
See application file for complete search history.

(56) References Cited

U.S. PATENT DOCUMENTS

| | | | |
|---|---|---|---|
| 7,257,584 B2 | 8/2007 | Hirschfeld et al. | |
| 7,574,496 B2 | 8/2009 | McCrory et al. | |
| 2002/0198824 A1* | 12/2002 | Cook | 705/38 |
| 2004/0133448 A1 | 7/2004 | Higashi et al. | |
| 2006/0235831 A1* | 10/2006 | Adinolfi et al. | 707/3 |
| 2007/0219992 A1* | 9/2007 | Bollinger et al. | 707/6 |
| 2008/0080718 A1 | 4/2008 | Meijer et al. | |
| 2008/0082480 A1 | 4/2008 | Gounares et al. | |
| 2008/0082490 A1 | 4/2008 | MacLaurin et al. | |
| 2008/0082538 A1 | 4/2008 | Meijer et al. | |
| 2008/0082601 A1 | 4/2008 | Meijer et al. | |
| 2008/0082782 A1 | 4/2008 | Meijer et al. | |
| 2008/0104393 A1 | 5/2008 | Glasser et al. | |
| 2008/0114817 A1 | 5/2008 | Gheorghioiu et al. | |
| 2009/0271468 A1 | 10/2009 | Distefano | |
| 2009/0300152 A1 | 12/2009 | Ferris | |
| 2010/0058291 A1 | 3/2010 | Hahn et al. | |
| 2010/0115284 A1 | 5/2010 | Hahn et al. | |
| 2010/0299763 A1 | 11/2010 | Marcus et al. | |
| 2010/0333116 A1 | 12/2010 | Prahlad et al. | |
| 2011/0295728 A1* | 12/2011 | Bulumulla et al. | 705/34 |

FOREIGN PATENT DOCUMENTS

WO    2006076520 A2    2/2007

OTHER PUBLICATIONS

International Search Report, PCT/CA2012/050018, May 10, 2012.

* cited by examiner

*Primary Examiner* — William Spieler
(74) *Attorney, Agent, or Firm* — Richard A. Wilhelm; David H. Judson

(57) ABSTRACT

A cloud enablement aggregation proxy (CEAP) receives and processes audit data from audited resources before such data is stored in a database. The CEAP manages log data for resources hosted in a multi-tenant shared pool of configurable computing resources (e.g., a compute cloud). A method for managing log data begins by the proxy aggregating and normalizing log information received from a plurality of the resources. The aggregated and normalized log information is then parsed to identify a tenant associated with each of a set of transactions. For each of the set of transactions, the CEAP annotates log data associated with the tenant and the particular transaction to include a tenant-specific identifier. An optional tenant separation proxy (TSP) separates the annotated log data on a per tenant basis prior to storage, and the tenant-specific log data may be stored in per tenant data structures or dedicated tenant log event databases to facilitate subsequent compliance or other analysis.

21 Claims, 6 Drawing Sheets

MULTI-TENANT AUDIT AWARENESS IN SUPPORT OF CLOUD ENVIRONMENTS

BACKGROUND OF THE INVENTION

1. Technical Field

This disclosure relates generally to cloud-based environments and, in particular, to techniques to produce customer-specific audit data for purposes of compliance analysis, reporting, problem determination, and forensics, among others.

2. Background of the Related Art

Businesses often have to provide information to show compliance with different government regulations. These regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g., using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management). Further, compliance with a particular policy, or a detailed forensics examination of actions within a system, may require more than just "audit" logs. It may also require access to error and trace logs, typically used within the scope of a problem determination examination.

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP.

Emerging cloud environments are being created out of existing IT infrastructures that are being adapted to support cloud-based services. One key characteristic of cloud computing that is different from existing environments is the requirement for so-called "multi-tenant" support, sometimes referred to as multi-customer single deployment. To satisfy this requirement, service providers have to be able to isolate different customer usage of the cloud services. In particular, customers have compliance guidelines that they follow, and need to follow, when using cloud services. These customers look to service providers to support their compliance requirements, and they desire to obtain data from the service providers to use for compliance analysis. The service providers need to supply that data, but at the same time maintain isolation between and among their specific customers that are sharing cloud resources. Current IT infrastructures do not allow for separating out compliance data contained in log files and audit records.

BRIEF SUMMARY

This disclosure describes a method and system to enrich (e.g., by annotation) received audit log data to enable such data to be associated with appropriate tenants (sometimes referred to herein as "customers") in a multi-tenant cloud deployment. The techniques described herein facilitate compliance analysis, including reporting and forensics analysis, without exposing one tenant's data to another customer.

In one embodiment, a cloud enablement aggregation proxy (CEAP) receives and processes audit data from audited resources before such data is stored in a database. The CEAP manages log data for resources hosted in a multi-tenant shared pool of configurable computing resources (e.g., a compute cloud). A method for managing log data begins by the proxy aggregating and normalizing log information received from a plurality of the resources. The aggregated and normalized log information is then parsed to identify a tenant associated with each of a set of transactions. In one embodiment, the parsing step compares an event pattern in a logged transaction against a set of filters, wherein each filter in the set uniquely associates a tenant-specific identifier and a particular event pattern. Upon a match between the event pattern in a transaction and one of the filters, the event pattern is annotated to include the tenant-specific identifier. Thus, in this manner the CEAP annotates log data to include tenant-specific identifiers before that data is sent to data storage. An optional tenant separation proxy (TSP) separates the annotated log data on a per tenant basis prior to storage, and the tenant-specific log data may be stored in per tenant data structures or dedicated tenant log event databases to facilitate subsequent compliance or other analysis.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
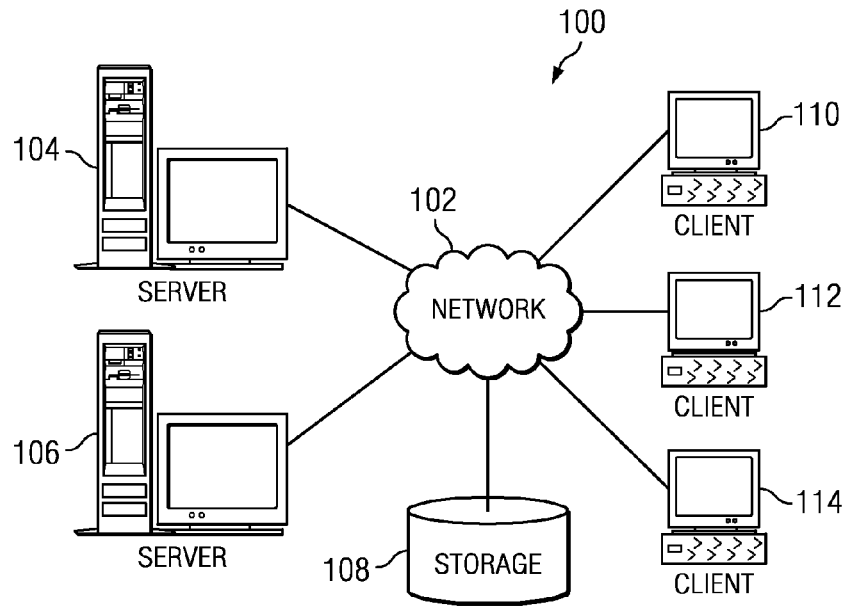
FIG. 1 depicts an exemplary block diagram of a distributed data processing environment in which exemplary aspects of the illustrative embodiments may be implemented.
Figure 2:
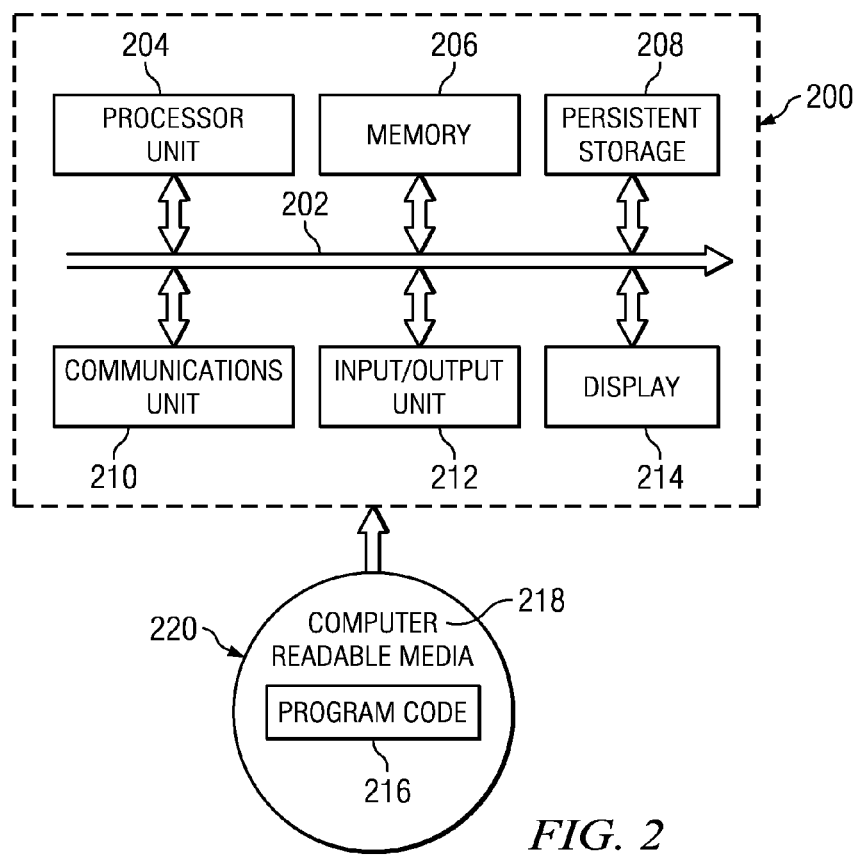
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Network Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
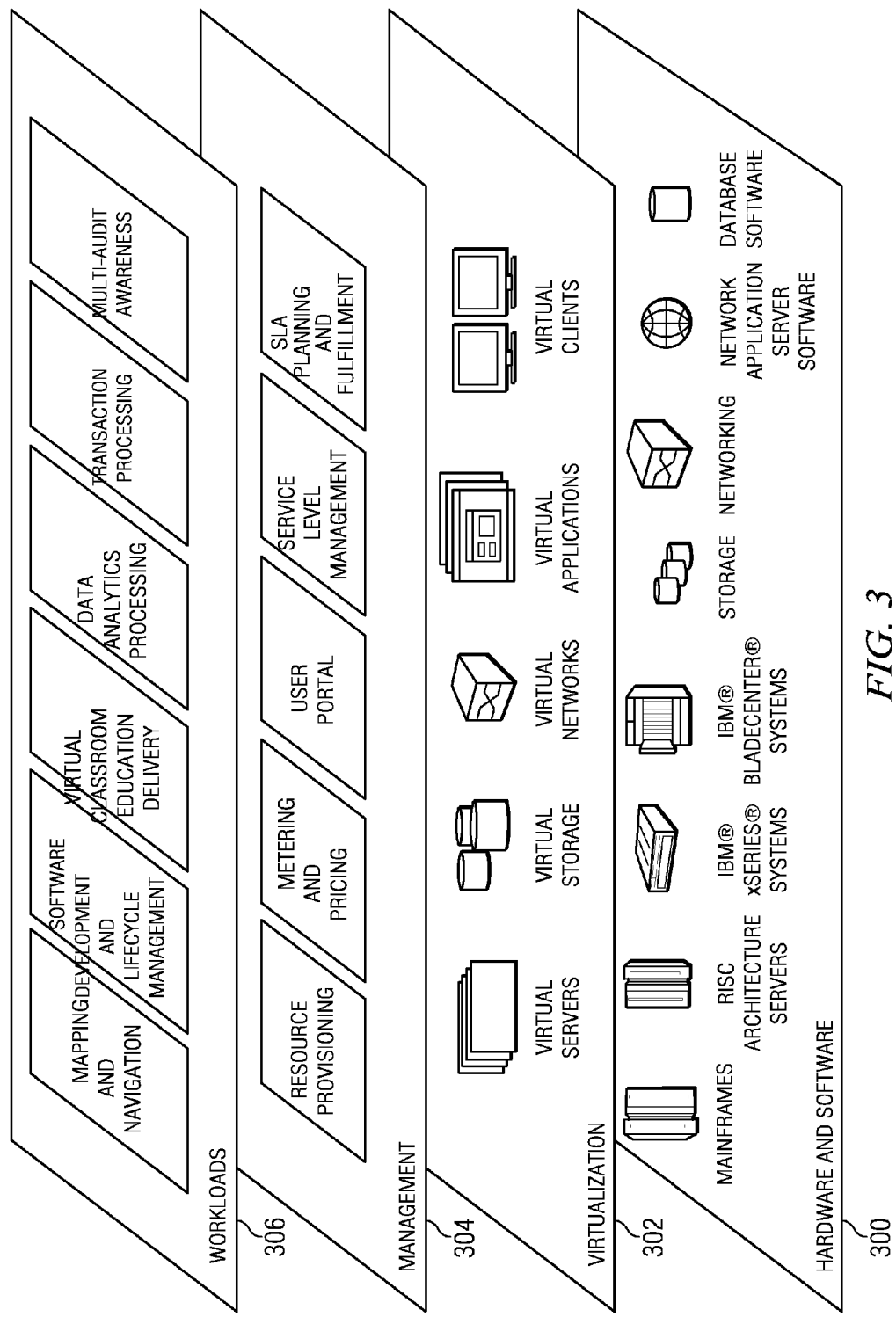
FIG. 3 depicts abstraction model layers of a cloud compute environment according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, multi-tenant audit awareness.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

Auditing

Figure 4:
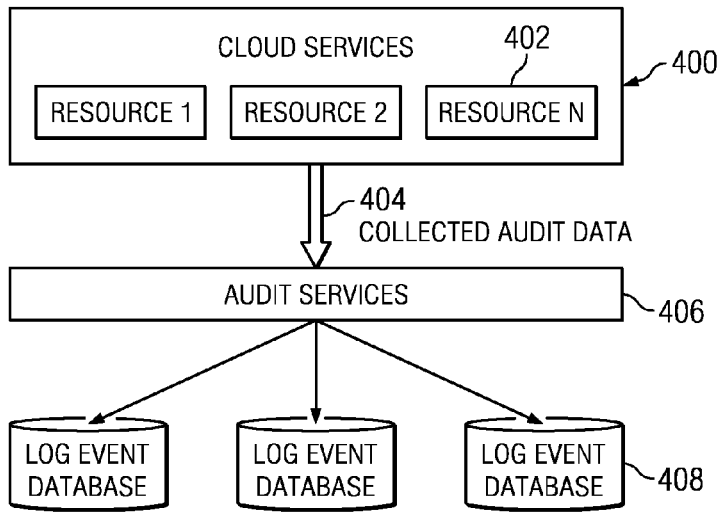
FIG. 4 depicts an existing approach wherein log data is retrieved from audited resources and put into a database for compliance analysis.

FIG. 4 illustrates how log data is retrieved from audited resources that are used to provide cloud services. In this example, the cloud services 400 expose a set of resources 402 (e.g., resources 1-$n$) hosted in a shared pool of configurable computing resources. Given the cloud paradigm described above, the "resource" should be broadly construed to cover any system, machine, process, program, application, utility, object or data associated therewith. Typically, collected audit data 404 is provided to an audit service 406, which normalizes that data and puts into log event databases 408 to allow for analyzing the data and creating reports that can be used for compliance. Audit service 406 typically comprises a distributed set of machines, programs and associated data structures that collectively provide the service, all in a known manner. As used herein, an audited resource within the cloud services environment is sometimes referred to herein as an operational management product (OMP). In this context, an OMP typically is deployed in a single customer environment and, as such, its associated log data does not include any information that can serve to distinguish that data from similar data generated by other such sources. In this respect, the OMP is said to be "multi-tenant unaware." As a consequence, the audit service (such as shown in FIG. 3) is not set up to support the inclusion with the logged data of a "customer identity." Thus, multi-tenant support for auditing is not available.

Multi-Tenant Audit Awareness

Figure 5:
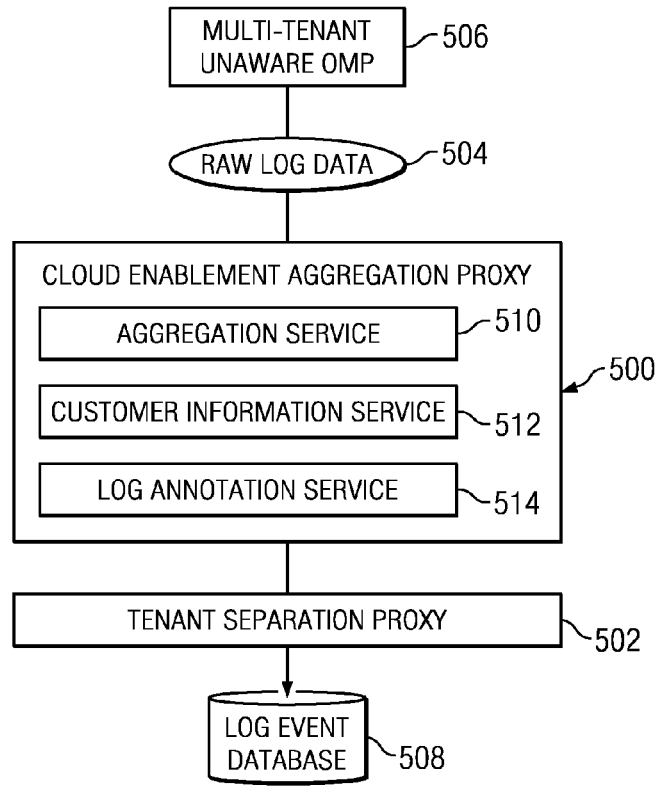
FIG. 5 illustrates a cloud enablement aggregation proxy (CEAP) and tenant separation proxy (TSP) according to this disclosure.

The subject disclosure addresses this need, as is now described. With reference to FIG. 5, and according to this disclosure, an audit service comprises several additional components to facilitate customer-specific logging in a multi-tenant cloud-based environment. In particular, preferably the service comprises a "cloud enablement aggregation proxy" (or CEAP) 500, and an optional "tenant separation proxy" (or TSP) 502. This nomenclature should not be taken to limit this disclosure, but is only used for convenience. Generally, the cloud enablement aggregation proxy 500 receives raw log data 504 from one of more multi-tenant unaware resources, one of which is shown at reference numeral 506. In one embodiment, and as noted above, the multi-tenant unaware resource may be an OMP operating within the context of an authentication and authorization framework that controls access to information and resources. One commercially-available framework of this type for protecting web resources is Tivoli Access Manager for e-business (TAMeb), also known as WebSEAL. Of course, the techniques described herein are useful for any type of log data irrespective of how that data is generated.

More generally, the log data (e.g., records, audit data, event messages, and the like) may be generated by any aspect of the computing environment associated with the resource 506 including, without limitation, software applications, event loggers, audit services, hardware auditing components, kernel modules, and the like. Log data may be generated as a result of the execution of some function, or as a result of a lack of activity. As used herein, the particular data should be broadly construed, and the term "record" should not be construed to be limited to a particular required data format or data structure.

As will be described below, the cloud enablement aggregation proxy 500 processes that data 504, and it then outputs the processed data to the tenant separation proxy 502, which then writes the "enhanced" data to a log event database 508.

In this embodiment, the cloud enablement aggregation proxy 500 comprises a set of services (or functions), which are identified in the drawing as an aggregation service 510, a customer identification service 512, and a log annotation service 514. These services may be integrated with one another in whole or in part. The aggregation service 510 identifies the tenant/customer associated with a particular transaction or audit log (represented by raw log data 504). The customer information service 512 maintains customer information tags that are used to identify the different tenants (customers) and their associated tenant-specific data. The log annotation service 514 optionally functions to annotate the log raw log data that has been determined (by services 510 and 512) to be associated with the specific tenant. The tenant separation proxy 502, which is an optional component, preferably handles writing of the data (as processed by the cloud enablement aggregation proxy 500) to the log event database 508. This write operation is performed according to a local configuration enforced by the tenant separation proxy when the proxy is implemented as part of the solution.

The proxies 500 and 502 typically are implemented in software, stored in computer memory as a set of computer program instructions, and executed by one or more processors as a specialized or dedicated machine. The proxies 500 and 502 may be combined together as a single proxy, or one or more functions thereof (such as services 510, 512 or 514) may be distributed across multiple machines. The proxies may be located in different network or geographic locations, and they may be located remotely from the resource 506 or database 508.

Figure 6:
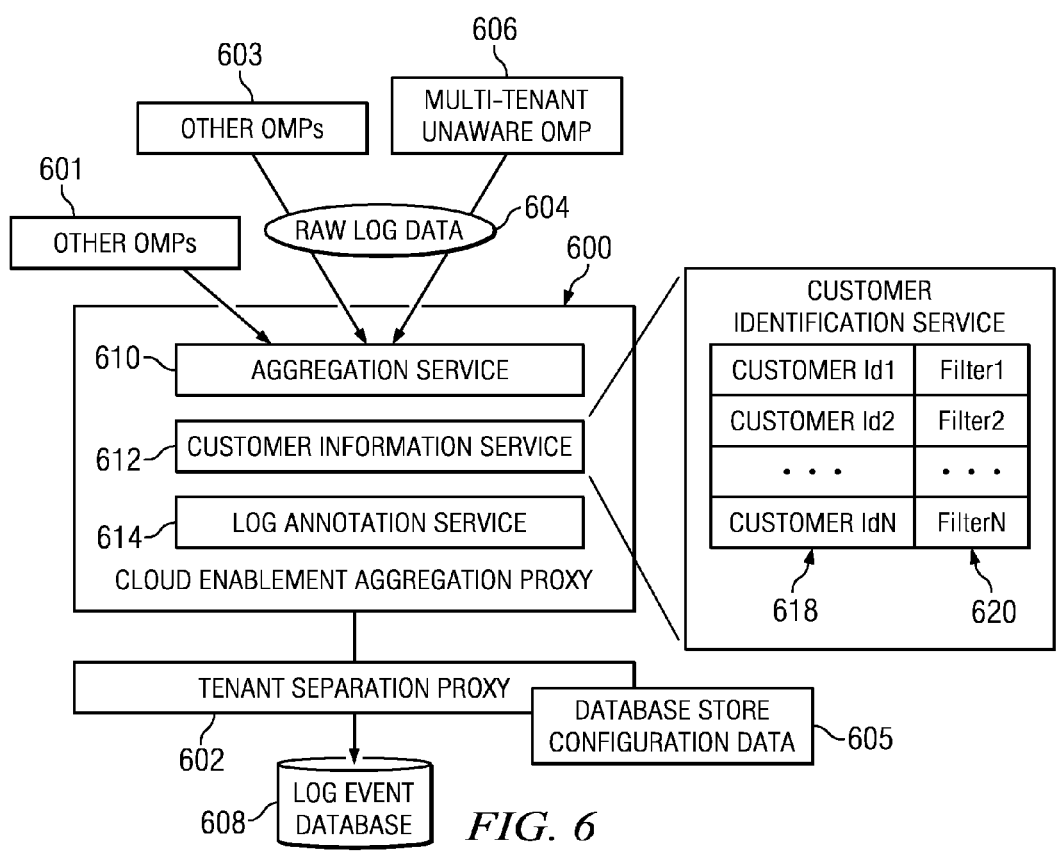
FIG. 6 illustrates a first embodiment of this disclosure by which audit data is collected and maintained separately for individual cloud tenants.

A more detailed description of the operation of the cloud enablement aggregation proxy 600 is seen in FIG. 6. As illustrated, in addition to receiving raw log data from the multi-tenant unaware resource 606 (or multiple such resources), the aggregation service 610 also receives input(s) from multiple other sources (OMP or others) within the cloud environment including, without limitation, routers, session management caches, reverse DNS, reverse proxies, user registries, and the like. These disparate sources are represented in FIG. 6 by resources 601 and 603. Using a Customer Identification Service (CIS) component 615 of the customer information service 612, the aggregation service 610 uniquely identifies the customer/tenant that an entity (typically an end user client browser, rich client, or the like) is bound to during a cloud service transaction. Preferably, the aggregation service 610 implements a rules engine that uses one or more rules to identify a tenant/customer from the input data. As needed, the aggregation service 610 interacts with CIS 615 as part of the unique customer identification. For example, in some cases, a customer may be identified by an IP address from which a request is initiated. In other cases, a customer may be identified by an identity carried in an SSL certificate associated with a secure transaction. In yet another case, a customer may be "identified" indirectly, e.g., by a parameter selected in a drop-down screen as part of a Web user interface (UI)-based authentication. Thus, and to this end, the CIS 615 maintains a set of customer identification tags that can be used in various ways to identify the different customers and/or other data (e.g., customer contracts) needed to identify tenant-specific data. The customer/tenant identifiers (IDs) stored may comprise a simple customer number, a name, a hierarchical name, or some other identifier that can be used to identify a customer that is using a cloud service (perhaps with respect to a specific contract).

Because an entity in the environment may be bound to multiple customers/tenants, it is not always possible to simply identify a particular named individual as belonging to a particular customer/tenant. Thus, the CIS 615 also preferably comprises an association of "event patterns" with customer identification tags. As used herein, preferably an event pattern is defined by way of a filter. Thus, the CIS 615 comprises a data structure in the form of a table (or equivalent data structure) that associates a Customer identifier (idN) 618 with one more associated Filter identifiers (each a FilterN) 620.

In operation, the aggregation service 610 (and, in particular, the rules engine) takes the received input data, normalizes that data, and the tries to match the event patterns (as described in the filters) against the normalized event data. Events that match a pattern are then "enriched" with customer-specific information, preferably by adding the customer tag(s) into the normalized events, although other types of enrichment may be used as well. By virtue of this enrichment, i.e., the inclusion of such customer-specific information, one or more other processes in the audit service can then identify to which tenant the log data belongs. Thus, for example, FIG. 6 illustrates the tenant separation proxy 602 feeding the annotated customer data into the log event database 608. In this embodiment, the annotated data is stored according to a local configuration 605. In operation, the TSP 602 separates the data on a per tenant/customer basis. As noted above, the TSP 602 is optional; if desired, the CEAP 600 can feed directly to an existing database.

The technique used by the aggregation service to normalize the received input data may vary. In one known approach, a signed or encrypted copy of an unaltered record is taken, and then parsing rules (e.g., XSLT-based or regular expression-based rules) are applied to the copy. The rules search for known patterns or known locations in the record, extract the data, and map it into known fields in an XML/CSV/text file with defined name/value pairs. The names represent the "who/what/where" fields, and the value is the data extracted from the record. This new file is then used for generating reports. In another known approach, the record is digitally signed (to ensure that it has been tampered with), and then appended with additional information, such as the "who/what/where" data, with the result then used for subsequent reporting. Typically, each OMP's specific log format is distinct.

Figure 7:
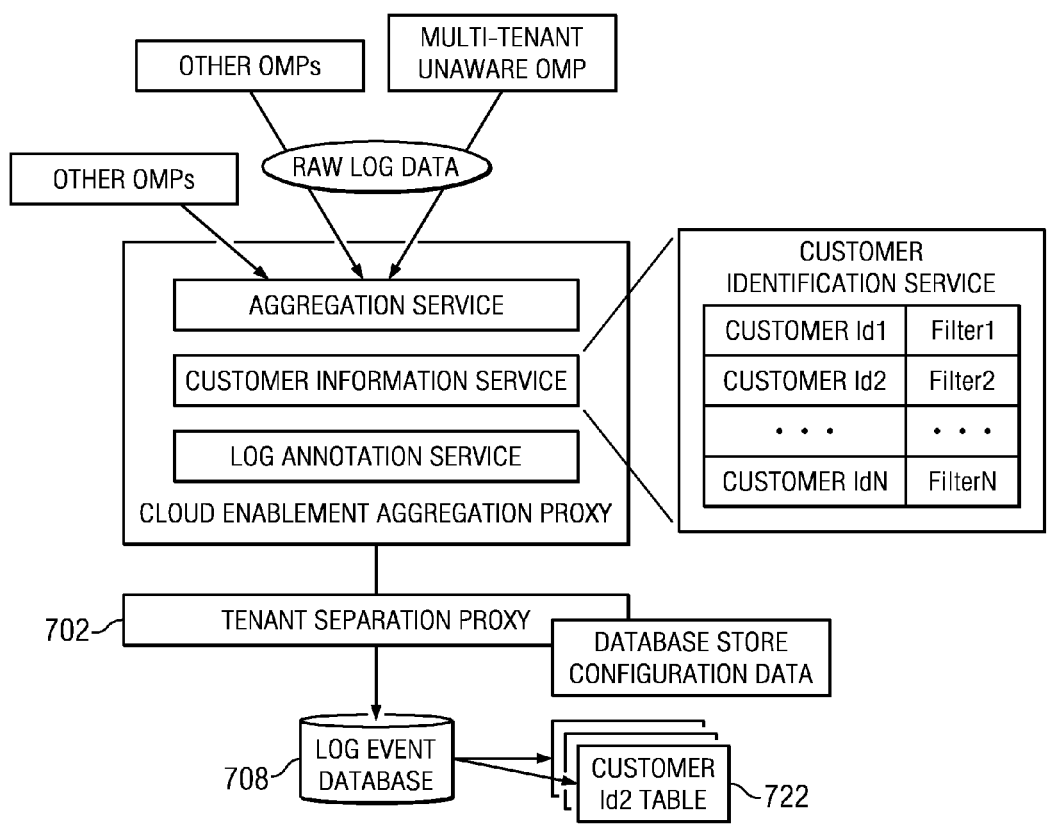
FIG. 7 illustrates a second embodiment of this disclosure wherein the per tenant log data is made available in per tenant data structures in a log event database.

As illustrated in FIG. 7, after separating the data on a per tenant/customer basis, the TSP 702 may feed the log data into individual customer tables 722 associated with the log event database 708. Thus, there may be one or more tables associated with each particular Customer IdN. In this embodiment, the data may or may not be annotated on a per customer level. In addition, and although not illustrated, customers may also be provided the tenant-specific normalized data to use for their own compliance purposes, e.g., storing log records for set time periods.

Figure 8:
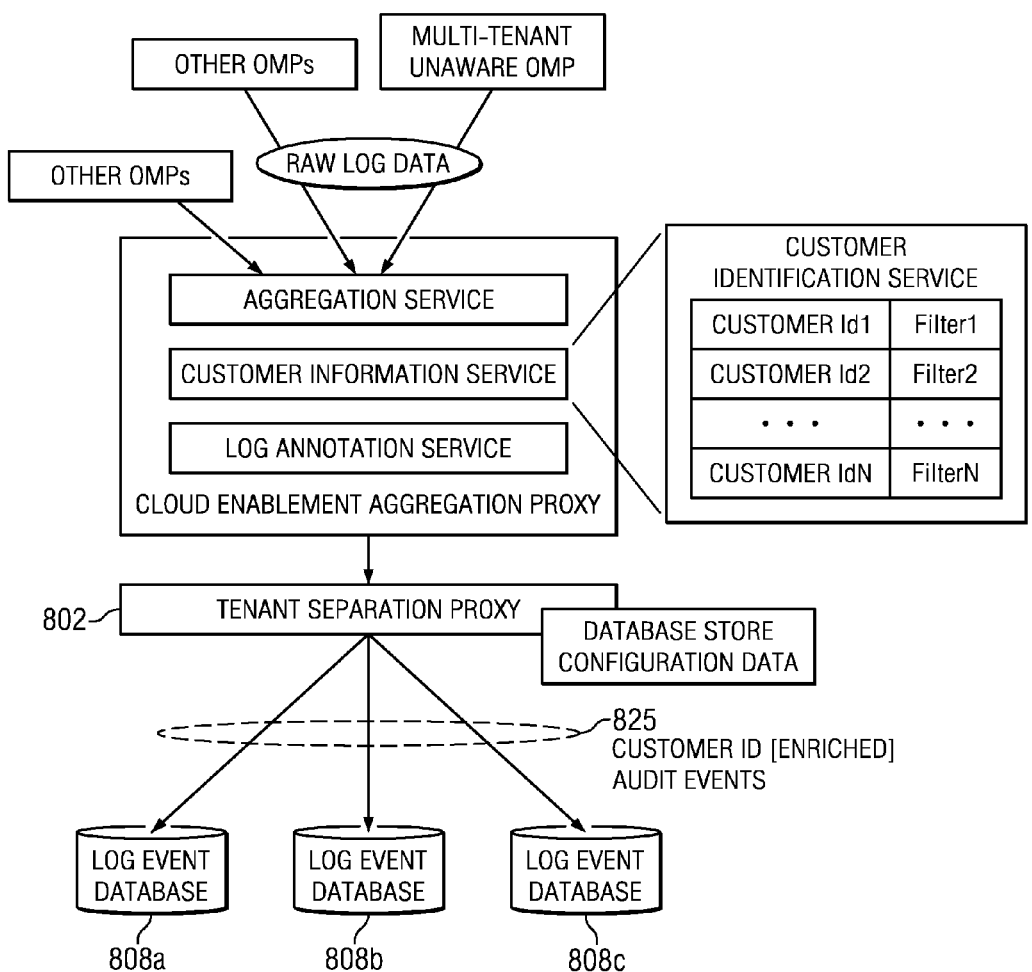
FIG. 8 illustrates a third embodiment of this disclosure wherein the per tenant log data is made available in per tenant log event databases.

As illustrated in FIG. 8, following tagging by the CAEP, and after the TSP 802 separates the data on a per tenant/customer basis, the log data can be routed to individual log event databases, three of which are shown at 808*a*, 808*b* and 808*c*, based on additional configuration data. Preferably, in this embodiment, there is a separate log event database 808 associated with each customer (i.e., one per tenant). The additional configuration data may define other required configurations (not shown).

In any of the above-described embodiments, the enriched log data can then be used to perform tenant-specific compliance analysis against the data, and to produce tenant-specific compliance reports.

Some of the audit and/or log data may be applicable to all or some defined subset of customers. An example would be log information about a patch update to a server on which part of the BSS is hosted, or a fix applied to a hypervisor hosting images associated with a subset of customers. Thus, according to the technique herein, a particular log record also may be annotated to belong to more than one customer, a subset of customers, or even all customers.

The technique described herein has several advantages. Foremost, a cloud service provider can use the annotation technique to ensure that log data is appropriately associated with a particular tenant/customer. This enables the service provider is meet its compliance requirements, while at the same time providing tenant-specific log data that a particular tenant/customer can use to meet its own such requirements. Using the described above, compliance data contained in log files and audit records is separated and annotated in a manner that ensures integrity of that data, thus preserving tenant (and end user) privacy and security concerns. The CEAP conveniently aggregates information from disparate sources, identifies the particular tenants associated with each transaction, and enhances the audit log information with tenant-specific identifiers so that the data can be used for tenant-specific analysis. A multi-tenant unaware resource may take advantage of this approach to ensure that the log data generated by logging of that resource is useful, even as the resource is shared. This approach facilitates multi-tenant audit awareness within a cloud compute environment, even for multi-tenant unaware products, further enhancing the value of the cloud services.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, and as noted above, the cloud enabling aggregation proxy function is implemented in software, which includes but is not limited to firmware, resident software, microcode, and the like. The data (e.g., the annotated log data, audit records, and the like) can be configured into a data structure (e.g., an array, a linked list, etc.) and stored in a data store, such as computer memory. Furthermore, as noted above, the multi-tenant audit awareness functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the multi-tenant auditing components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The multi-tenant auditing function may be implemented as an adjunct or extension to an existing audit service, logging service, or access manager solution. The technique also may be implemented in an automated compliance manager solution. One such automated solution is available commercially as Tivoli® Compliance Insight Manager, available from IBM® Corporation. This solution is a security compliance system, which operates on or across a network within or across an enterprise environment to collect, analyze and archive log data and to produce detailed security reports on information security policy compliance. A compliance manager system typically comprises a server, one or more actuators, a Web-based portal, and a management console. The server collects, archives, normalizes, and reports on log data from audited systems and devices. An actuator is a software component that maintains a secure connection between the server and one or more software agents running on each audited system. Actuator scripts enable the software agent to collect data (such as, without limitation, audit data) from supported platforms, which are also referred to as "event" sources. In operation, devices and systems are instrumented with the software agents. These devices and systems generate logs of user activities, processes, and event every time a person or system interacts with the network. These logs provide a record of all network activities and can be analyzed to show whether user behavior is in compliance with a given policy.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application. Further, while typically the client-server interactions occur using HTTP, this is not a limitation either. The client server interaction may be formatted to conform to the Simple Object Access Protocol (SOAP) and travel over HTTP (over the public Internet), FTP, REST, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. A method of managing log data generated by resources hosted in a multi-tenant shared pool of configurable computing resources, comprising:
   aggregating and normalizing log information received from a plurality of the resources hosted in the multi-tenant shared pool of configurable computing resources, at least one of the configurable computing resources being a multi-tenant unaware resource that is shared among at least first and second tenants, the multi-tenant unaware resource generating log information that does not include any information that, by itself, can serve to distinguish which of the first and second tenants use the multi-tenant unaware resource, the log information being normalized by mapping data within the log information into one or more name/value pairs;
   receiving input data as tenants carry out transactions in the multi-tenant shared pool of configurable computing resources, the input data being other than the generated log information generated by the multi-tenant unaware resource;
   parsing the input data and the aggregated and normalized log information to identify a tenant associated with each of a set of transactions, wherein parsing compares an event pattern in a transaction against a set of filters; and
   for each of the set of transactions, and based on the parsing identifying a match between an event pattern in a transaction against a filter in the set of filters, annotating log data associated with the tenant and the particular transaction to include a tenant-specific identifier;
   wherein at least one of the aggregating, parsing and annotating operations is carried out in program code executing in a hardware element.

2. The method as described in claim 1 further including storing the annotated log data for multiple tenants.

3. The method as described in claim 2 further including separating the annotated log data on a per tenant basis prior to storing.

4. The method as described in claim 1 wherein the set of filters includes a filter that uniquely associates a tenant-specific identifier and a particular event pattern.

5. The method as described in claim 4 wherein the annotating step enriches event pattern data to include the tenant-specific identifier that is associated with a match between the event pattern in a transaction and one of the filters in the set of filters.

6. The method as described in claim 1 wherein each of the resources is a multi-tenant unaware resource.

7. The method as described in claim 1 further including performing a compliance analysis on per tenant-specific log data.

8. Apparatus to manage log data generated by resources hosted in a multi-tenant shared pool of configurable computing resources, comprising:
   a processor;
   computer memory holding computer program instructions executed by the processor to perform operations comprising:
      aggregating and normalizing log information received from a plurality of the resources hosted in the multi-tenant shared pool of configurable computing resources, at least one of the configurable computing resources being a multi-tenant unaware resource that is shared among at least first and second tenants, the multi-tenant unaware resource generating log information that does not include any information that, by itself, can serve to distinguish which of the first and second tenants use the multi-tenant unaware resource, the log information being normalized by mapping data within the log information into one or more name/value pairs;
      receiving input data as tenants carry out transactions in the multi-tenant shared pool of configurable computing resources, the input data being other than the generated log information generated by the multi-tenant unaware resource;
      parsing the input data and the aggregated and normalized log information to identify a tenant associated with each of a set of transactions, wherein parsing compares an event pattern in a transaction against a set of filters; and
      for each of the set of transactions, and based on the parsing identifying a match between an event pattern in a transaction against a filter in the set of filters, annotating log data associated with the tenant and the particular transaction to include a tenant-specific identifier.

9. The apparatus as described in claim 8 wherein the operations further include storing the annotated log data for multiple tenants.

10. The apparatus as described in claim 9 wherein the operations further include separating the annotated log data on a per tenant basis prior to storing.

11. The apparatus as described in claim 8 wherein the set of filters includes a filter that uniquely associates a tenant-specific identifier and a particular event pattern.

12. The apparatus as described in claim 11 wherein the annotating step enriches event pattern data to include the tenant-specific identifier that is associated with a match between the event pattern in a transaction and one of the filters in the set of filters.

13. The apparatus as described in claim 9 wherein each of the resources is a multi-tenant unaware resource.

14. The apparatus as described in claim 9 wherein the operations further include performing a compliance analysis on per tenant-specific log data.

15. A computer program product in a non-transitory computer readable medium for use in a data processing system to manage log data generated by resources hosted in a multi-tenant shared pool of configurable computing resources, the computer program product holding computer program instructions which, when executed by the data processing system, perform a method comprising:

aggregating and normalizing log information received from a plurality of the resources hosted in the multi-tenant shared pool of configurable computing resources, at least one of the configurable computing resources being a multi-tenant unaware resource that is shared among at least first and second tenants, the multi-tenant unaware resource generating log information that does not include any information that, by itself, can serve to distinguish which of the first and second tenants use the multi-tenant unaware resource, the log information being normalized by mapping data within the log information into one or more name/value pairs;

receiving input data as tenants carry out transactions in the multi-tenant shared pool of configurable computing resources, the input data being other than the generated log information generated by the multi-tenant unaware resource;

parsing the input data and the aggregated and normalized log information to identify a tenant associated with each of a set of transactions, wherein parsing compares an event pattern in a transaction against a set of filters; and for each of the set of transactions, and based on the parsing identifying a match between an event pattern in a transaction against a filter in the set of filters, annotating log data associated with the tenant and the particular transaction to include a tenant-specific identifier.

16. The computer program product as described in claim 15 wherein the method further includes storing the annotated log data for multiple tenants.

17. The computer program product as described in claim 16 wherein the method further includes separating the annotated log data on a per tenant basis prior to storing.

18. The computer program product as described in claim 15 wherein the set of filters includes a filter that uniquely associates a tenant-specific identifier and a particular event pattern.

19. The computer program product as described in claim 18 wherein the annotating step enriches event pattern data to include the tenant-specific identifier that is associated with a match between the event pattern in a transaction and one of the filters in the set of filters.

20. The computer program product as described in claim 15 wherein each of the resources is a multi-tenant unaware resource.

21. The computer program product as described in claim 15 wherein the method further includes performing a compliance analysis on per tenant-specific log data.

\* \* \* \* \*